Figure 5:
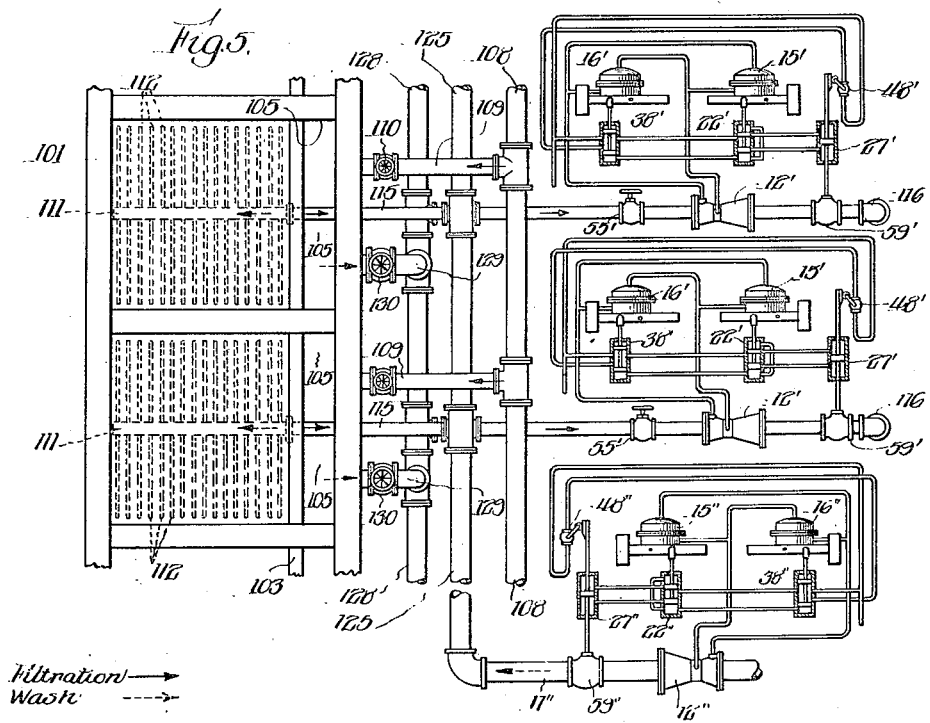

July 5, 1932. S. L. ADELSON 1,866,284
FLOW CONTROL
Filed Feb. 6, 1928 4 Sheets-Sheet 1
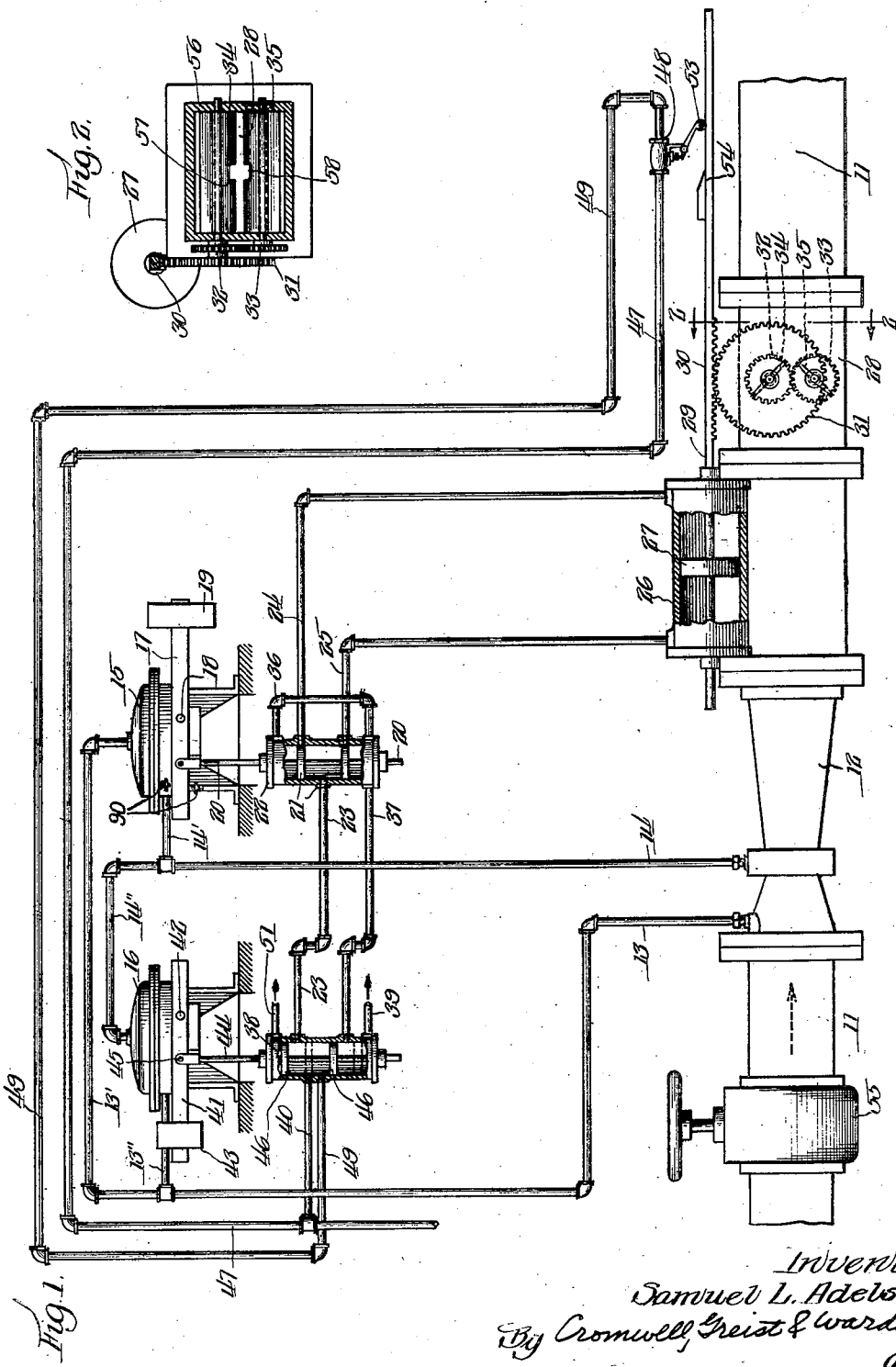

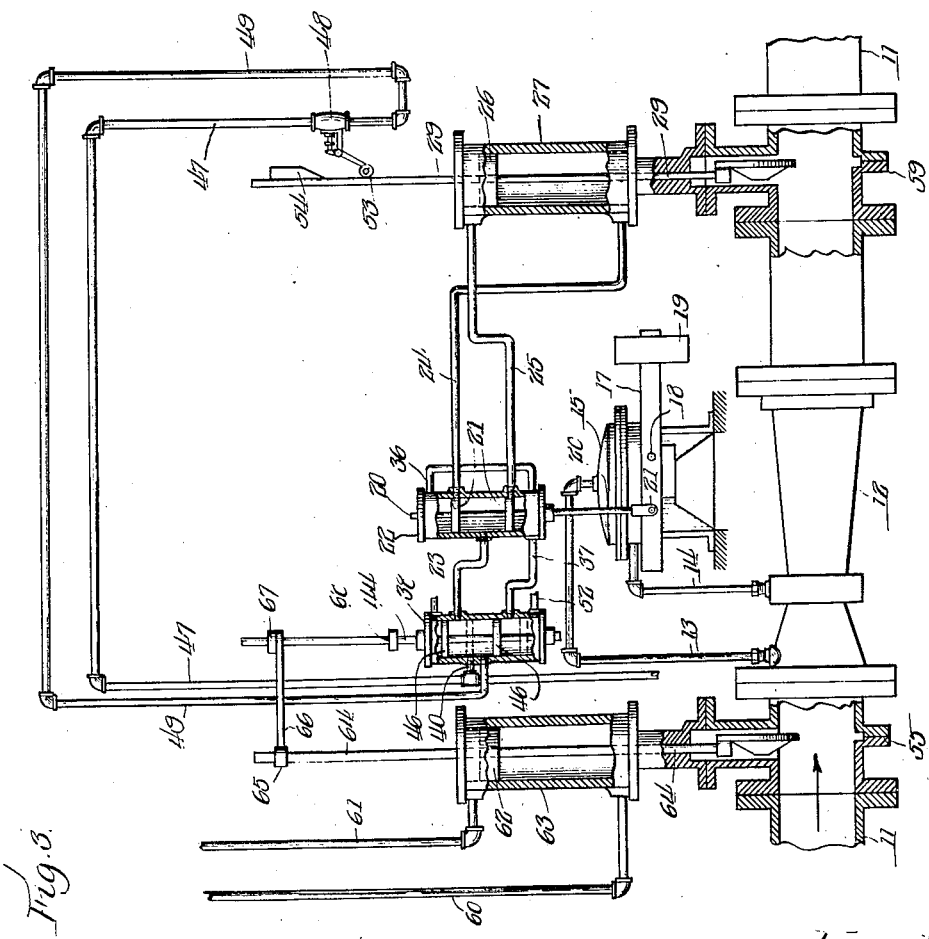

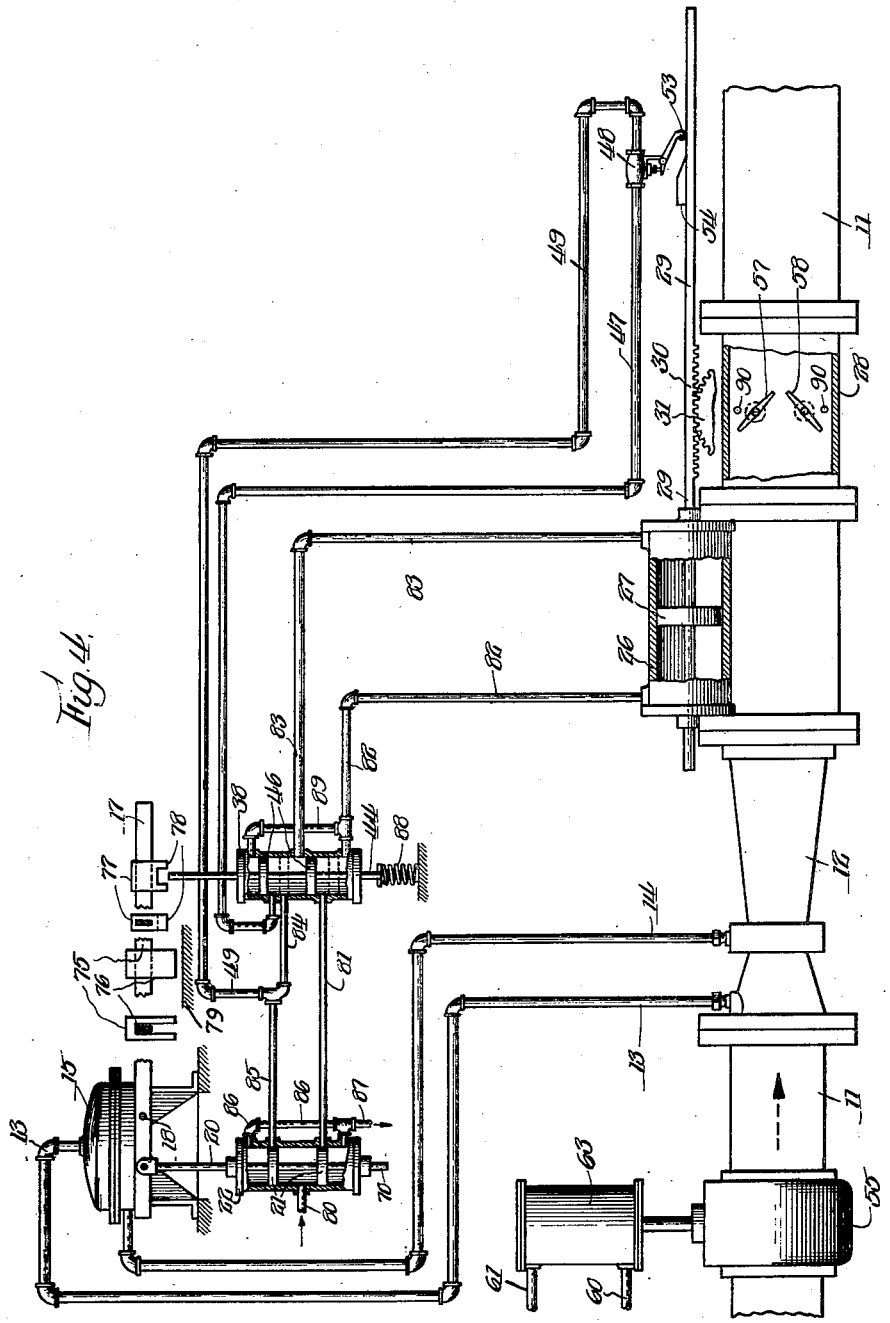

July 5, 1932.  S. L. ADELSON  1,866,284
FLOW CONTROL
Filed Feb. 6, 1928  4 Sheets-Sheet 4

Filtration ⟶
Wash ⟶

Inventor:
Samuel L. Adelson,
by Cromwell, Greist & Warden
attys.

Patented July 5, 1932

1,866,284

UNITED STATES PATENT OFFICE

SAMUEL L. ADELSON, OF CHICAGO, ILLINOIS, ASSIGNOR TO GENERAL ZEOLITE COMPANY, OF CHICAGO, ILLINOIS, A CORPORATION OF ILLINOIS

FLOW CONTROL

Application filed February 6, 1928. Serial No. 252,187.

This invention relates to flow control systems, particularly in connection with filtration plants.

In flow control systems the apparatus is customarily so designed that it will tend to keep a constant amount of water or other liquid passing through a pipe or conduit per unit of time. The systems are most frequently employed in fluid distribution systems in which there is a varying resistance in some part of the line, which varying resistance cannot be readily controlled. The flow control system serves to compensate this varying resistance and enables the maintenance of a constant flow.

In filtration plants the water is customarily filtered through a sand bed before passing a flow control apparatus. The sand beds are required to function at a certain predetermined rate of flow in gallons per square foot per minute. The flow control system tends to maintain this predetermined rate of flow.

The resistance in a filter bed gradually increases with the passage of time and the flow through the bed and in the line tends to decrease with such increasing resistance. The control system then operates to decrease a variable resistance in some other part of the line, so that the total resistance of the entire line, including that of the bed, will remain constant. The control apparatus frequently accomplishes this by gradually opening a valve which may be either of the gate or butterfly type. The opening of this valve decreases the amount of resistance in the line so that the total resistance will be constant. As a result the flow, which will be governed by the total resistance, will also be constant.

Difficulties are experienced in the operation of these systems when it is necessary to stop the flow altogether for a period. For example, sand filter beds must be back-washed at intervals when the resistance therein has increased to such a point as to prevent efficient operation. During the back-washing operation, the line is closed off entirely. The control system opens the control valve to its widest extent to decrease the total resistance in the line as much as possible since the main valve, which is now closing the line, constitutes an infinite resistance. When the back-washing is completed the filter will be put back in operation by opening the main valve. At such time, the control valve will be fully open and a violent rush of water will take place through the filter bed, which at this time has the least resistance. This will result in a disturbance of the filter bed by the passage of a greater amount of water than the bed is rated for, and in a lowered efficiency. A considerable period of time will elapse before the controller is again correctly rating the amount of liquid passing through the filter bed.

An object of this invention is to provide a flow control system which will insure a constant rate of flow at all times.

Another object of this invention is to provide a flow control system which will insure the predetermined rate of flow when the flow in the line commences after a stoppage.

A further object of this invention is to provide a flow control system which will set the variable resistance in any desired position when the flow through the line has ceased.

A still further object of this invention is to provide a flow control system which will prevent the overrating of sand filter beds in filtration plants when the bed is put back into the line after back-washing.

In its preferred form, the present invention provides a flow control system in which a flow measuring device such as a differential pressure device is placed upon a liquid line. The flow measuring device or the differential pressure device is operatively connected through suitable means to a controlling valve or other variable resistance positioned upon the liquid line. This valve will be gradually opened or shut as the resistance in other parts of the liquid distribution system increases or decreases. In this manner a constant resistance is maintained in the line, and a constant flow will take place, the controlling valve compensating for an increasing or decreasing resistance in some other part of the line. When the line is shut down for a period, or when the flow therethrough substantially ceases the flow measuring device or the differential pressure device will tend to actuate the controlling valve so as to open it to its greatest extent. At this point another controlling means is brought into operation to set the controlling valve in any desired position, preferably at the position in which it is desired it should be when the flow commences through the line. In the preferred embodiment of the invention the flow measuring device comprises a Venturi tube.

The drawings illustrate a preferred embodiment of the invention.

Figure 6:
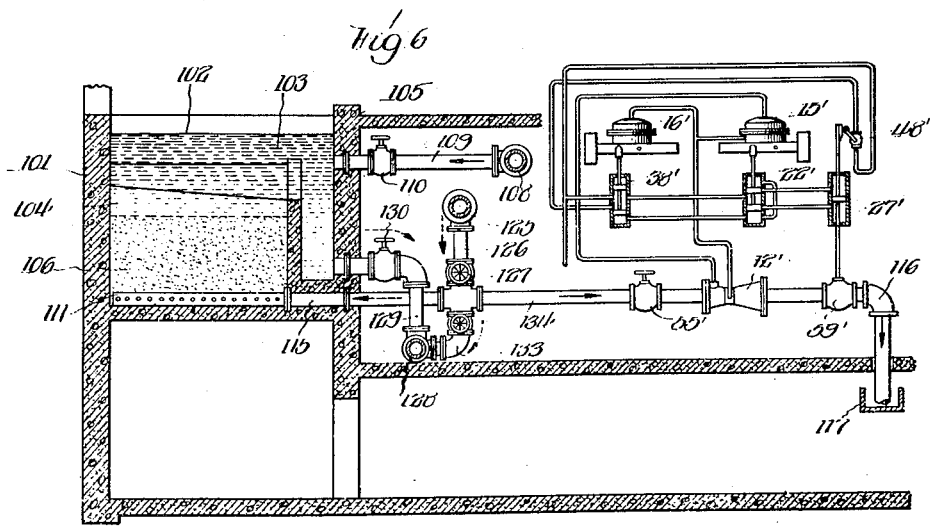

Figure 1 diagrammatically shows an arrangement by means of which the constant flow and the reset are obtained by two diaphragm chambers;

Figure 2 is a cross section upon the line 2—2 of Figure 1, showing one form of controlling valve as used in Figure 1;

Figures 3 and 4 diagrammatically show modified arrangements in which only one diaphragm chamber is used;

Figure 5 is a plan view of a portion of a filtration plant with a diagrammatic illustration of the connection of the flow control systems therewith; and Figure 6 is a vertical sectional view through one of the filter beds shown in Figure 5.

In Figure 1, the water passes through the line 11 to or from some point of use in or at which the resistance is variable. This point of use may be a filter or a zeolite water softener. In its passage through line 11, the water passes through the Venturi tube 12. The up-stream side of the Venturi tube and the throat section of the Venturi tube are connected to a diaphragm chamber 15 by the lines 13 and 13', and 14 and 14' respectively. The up-stream side of the Venturi tube 12 is connected to the upper compartment of the diaphragm chamber 15 and the throat section of the Venturi tube 12 is connected to the lower compartment of the diaphragm chamber 15. The up-stream and throat sections of the Venturi tube 12 are also connected to the diaphragm chamber 16 by means of the lines 13 and 13'' and 14 and 14'' respectively, the throat section being connected to the upper compartment of the diaphragm chamber 16 and the up-stream side being connected to the lower compartment of the diagram chamber 16.

The diaphragm chamber 15 is provided with a lever 17 which is actuated by the diaphragm. The lever is pivotally connected to the diaphragm at the point 18 and has a movable weight 19 on it right arm, which can be set in any desired position. The weight 19 is so adjusted in size and position that it will exactly balance the difference in pressure in the diaphragm chamber 15 when a predetermined normal flow takes place through the line 11. The diaphragm is so connected to the lever 17 that the higher pressure on its upper surface will tend to raise the right arm of the lever.

Attached to the left arm of the lever 17 is a piston rod 20. The piston rod 20 carries the double piston 21 which rides in the cylinder of the pilot valve 22. Water under pressure is admitted to the pilot valve 22 through the pipe 23 and will pass through the pilot valve into either pipe 24 or 25 depending upon whether the double piston 21 is above or below its normal position. When the piston 21 is in its normal position (as shown) and the lever 17 is horizontal, the piston will prevent the passage of liquid into line 24 or 25. The liquid under pressure passes through either line 24 or 25 into a cylinder 26. The piston 27 actuates a butterfly valve 28 through a piston rod 29. The extension of the piston rod is provided with a rack 30 which engages the large gear wheel 31. The gear wheel 31 is directly connected to the smaller gear 32 which meshes with another gear 33 of equal size. The shafts of the gears 32 and 33 are connected to the shutters 34 and 35 respectively of a butterfly valve 28.

When the piston 21 is depressed, the water under pressure is admitted to the left side of cylinder 26 through line 25. The water will pass out of the right side of cylinder 26 by means of line 24. This liquid will pass to waste through the upper part of the pilot valve 22, the line 36 and the lower part of the pilot valve 22 into the line 37. This will cause the piston 27 to move toward the right closing the butterfly valve 28. When the piston 27 is to be moved toward the left opening the butterfly valve 28, the water under pressure will be admitted through line 24 to the right side of the cylinder 26 and the water from the left side of the cylinder will pass through line 25 and the lower part of the pilot valve 22 into the line 37. From the line 37, the waste water passes through the lower part of the pilot valve cylinder 38 and finally out through line 39. The water under pressure is admitted to the pilot valve 38 through the line 40 and it then passes through the central chamber of the pilot valve, the line 23, the central chamber of pilot valve 22, into either line 24, if the controlling valve is being opened, or into line 25, if the controlling valve is being closed.

In normal operation the pilot cylinder 38 acts merely as a conduit for the water under pressure from the line 40 to the line 23 and for the waste water from line 37 to the line 39. When the flow in the line 11 is stopped, this pilot valve is actuated so as to cut off the lines 40 and 39 from 23 and 37 respectively and cause the water under pressure and the waste water to pass through other connections. The diaphragm chamber 16 is externally provided with a lever 41 which is pivotally connected with the diaphragm at 1:

the point 42 and provided with a sliding weigth 43 which can be fixed in any desired position on the left arm of the lever. The diaphragm is so connected to the lever 41 that the resultant difference in pressure will tend to elevate the left arm of the lever and the weight 43 is made of such a small size that such difference in pressure will keep the weight in elevated position when any substantial flow is taking place through the line 11. The left arm of the lever 41 is attached to a piston rod 44 at the point 45. The piston rod 44 is connected with a double piston 46 which rides in the pilot valve cylinder 38.

When the flow has substantially ceased as when the valve 55 is closed, the weight 43 will be unbalanced and will bring down the lever 41 which in turn will depress the double piston 46 into the position indicated by the dotted lines. This will prevent the water under pressure from passing through line 40 to line 23 and will cause it to pass through line 47, valve 48 and line 49 and then into the pilot valve cylinder 38. The water under pressure will then pass through the cylinder 38 between the double pistons, the line 37, and the lower part of the pilot valve cylinder 22 into the line 25. The double piston 21 and the left arm of lever 17 are now in elevated position since the pressure on both sides of the diaphragm chamber 15 is substantially equal. The water will be admitted under pressure into the left side of cylinder 26 through the line 25 and will move the piston to the right forcing water from the right side of the cylinder out through the line 24, the middle chamber of the pilot cylinder 22, the line 23, and the upper portion of the pilot valve 38 into the line 51 to waste. This movement of the piston 27 will continue until the piston rod 29 by the rack 30 has closed the control valve 28 to a point where the stop 54 will meet the roller 53 and raise it, closing the valve 48. This will prevent any further flow through lines 47, 49 and 37.

As long as the flow through line 11 is stopped, double piston 46 will be depressed and the double piston 21 will be elevated. When the piston rod 29 has reached the position where the trip 54 will elevate the roller 53 and close the valve 48. No further flow will take place into the cylinder 26. The butterfly 28 will retain a position which will be approximately the predetermined initial flow position. As soon as the valve 55 is opened, the flow will again take place through the line 11 and the difference in pressure in diaphragm chambers 15 and 16 will immediately cause the double piston 21 to be depressed into its normal operating condition and the piston 46 to be elevated into its normal operating position as shown on Figure 1. During normal operation it makes no difference whether the valve 48 is open or closed since under either condition the fluid under pressure will pass to the line 23 through the central portion of the pilot valve 38.

To summarize the operation of the apparatus shown upon Figure 1, when the flow is above normal the piston 46 is moved slightly upwardly but not enough to affect the connections, the piston 21 is moved downwardly so as to connect the pipe 23 with the pipe 25 and the piston 27 is moved to the right so as to close the butterfly valve. The liquid under pressure flows through the pipe 40, between the double piston 46, through the pipe 23, between the double piston 21, through the pipe 25 into the left end of the cylinder 26. The liquid from the right end of the cylinder 26 flows through the pipe 24, above the upper piston 21, through the pipe 36, below the lower piston 21, through the pipe 37, below the lower piston 46 and out through the pipe 39.

When the flow is above normal, the double piston 46 will be slightly lowered but not sufficient to affect the connections, and the double piston 21 will be elevated so as to connect the pipe 23 with the pipe 24. The liquid under pressure will flow through the pipe 40, between the double piston 46, through the pipe 23, between the double piston 21, and through the pipe 24 to the right side of the cylinder 26, opening the butterfly valve. The liquid from the left end of the cylinder 26 will flow through the pipe 25, below the double piston 21, through the pipe 37, below the double piston 46, and out through the pipe 39.

When the valve 55 is closed and when the flow becomes zero, the immediate effect is for the apparatus to operate in the manner last described, raising the double piston 21 and opening the buterfly valve wide. When this occurs, the double piston 46 will be lowered into the position of the dotted lines, cutting off the line 40, whereupon the liquid under pressure will flow through the line 47, past the valve 48, through the line 49, between the double piston 46, through the line 37, below the double piston 21, and through the pipe 25 into the left side of the cylinder 26, closing the butterfly valve. The liquid from the right end of the cylinder 26 will flow through the line 24, between the double piston 21, the line 23 above the double piston 46 and out into the line 51. It will be noted that the pressure above and below the double pistons 21 and 46 will be maintained the same so that there will always be a balanced force acting upon said pistons. As a result the pistons may readily be moved by any variation in the position of the diaphragms in the chambers 15 and 16.

In the arrangement shown upon Figure 3, the main valve 55 instead of being a hand valve is a hydraulic valve and it is actuated from a main switch board by admitting a liquid under pressure to either lines 60 or 61 and controlling valve 59 is now a gate valve. The valve 55 is actuated through a piston rod 64 by piston 62 which rides within the cylinder 63. The piston rod 64 is provided with a fixed collar 65 at its upper end. The collar 65 carries a horizontal arm 66 which in its uppermost position strikes against the stop 67 on the piston rod 44 of the pilot valve 38. The striking of the arm 66 will lift the stop 67 and at the same time will lift the piston rod 44 so that the piston 46 of the pilot 38 will be in elevated position and permit the fluid under pressure to flow from line 40 to line 23 in the manner previously described. When valve 55 is being closed and liquid under pressure is admitted to line 61 from the main operating board, the piston 62 will be moved downwardly and the waste water from the lower side of cylinder 63 will pass through line 60. When the gate valve 55 is almost closed the arm 66 will strike against the lower stop 68 on the piston rod 44 depressing the double piston 46. As soon as the double piston 46 is depressed, it will cut off line 40 from 23 and will cause the liquid under pressure to flow through line 47, valve 48, line 49 and pilot valves 38 and 22 into cylinder 26 in the manner previously described for Figure 1. This flow will continue until the gate valve 59 is closed to such an extent that the trip 54 will come into contact with the roller 53 and close the valve 48. The closure of valve 48 will stop further passage of the fluid under pressure through the line 47. The gate valve 59 functions in the same way as the butterfly valve 28 shown upon Figure 1 and the two are interchangeable. The arrangement shown in Figure 3 enables the elimination of one of the diaphragm chambers shown upon Figure 1. It is necessary in practical operation to have some sort of catch attached to the piston rod 44 so as to maintain it in elevated position during normal operation in case the arm 66 may be depressed or out of contact with the stop 67.

In the arrangement shown upon Figure 4, the main valve 55 and the control valve 28 are similarly operated, and of the same construction, as the valve 55 in Figure 3 and the valve 28 in Figure 1. The control valve 28 which is of the butterfly type and is shown in section, is operated by the hydraulic arrangement comprising the pilot valves 22 and 38 and the hydraulic cylinder 26. The pilot valves 22 and 38 are operated by the diaphragm chamber 15 and the lever 17 which is connected to the diaphragm thereof. The diaphragm chamber 15 is connected to the Venturi meter 12 by the lines 13 and 14. The pilot valves 22 and 38, the hydraulic cylinder 26 and the diaphragm chamber 15 are of the same construction, and operate the same, as the similarly numbered parts upon Figures 1 and 3 except in the following respects. The diaphragm chamber is provided with a rather elongated lever 17 which is connected with the diaphragm in the interior of the chamber 15 at the fulcrum or pivot point 18. When the diaphragm is pushed downwardly due to an increased flow through line 11 the right arm of the lever 17 will be elevated and when the diaphragm is pushed upwardly due to a decreased flow in the line 11, the right arm of the lever 17 will be depressed. When the right arm of the lever 17 is elevated the left arm will be depressed lowering the double piston 21. Water or other liquid under pressure will then flow by the line 80, the middle portion of the cylinder of the pilot valve 22, the line 81, the lower portion of the cylinder of pilot valve 38, the line 82 to the left side of the piston 27. This will partially close the valve 28 and decrease the flow in line 11. During normal operation the piston 46 will be maintained in the elevated position shown by the solid lines. The waste water from the right side of piston 27 will flow by the line 83, between the double pistons 46, the line 84, the line 85, above the double piston 21, the line 86 and the line 87.

When the right arm of the lever is depressed, raising the double piston 21, water or other liquid under pressure will flow by the line 80, between the double pistons 21, the line 85, the line 84, between the double pistons 46 and the line 83 to the right side of the piston 27. The piston 27 will be forced to the right opening the valve 28 and permitting an increased flow in line 11. The waste liquid from the left side of the piston 27 will flow by the line 82 below the double pistons 46, the line 81, below the double pistons 21 and the line 87.

At normal rates of flow the difference in pressure within the diaphragm chamber will be exactly balanced by the moment of the weights 75 and 77 the former of which may be moved along and set in any desired position upon the right arm of the lever 17. The lever 17 is shown broken so as to permit the showing of side views of the weights 75 and 77. The weight 75 is provided with a deep recess 76 by means of which it is attached to and slides upon the lever. When the right arm of the lever is depressed a great amount due to stoppage of flow in the line 11 the weight 75 will be lowered to, and cause to rest upon, the table 79. The lever will still be free to move downwardly through the open groove 76. The only effective weight on the arm will then be the relatively small weight 77. At about the time the weight 75 comes into contact with the table 79 the weight 77 will come into contact with, and rest upon, the top of the piston rod 44 of the auxiliary pilot valve 38. The weight due to the right arm of lever 17 and the part 77 is sufficient to compress the spring 88 and force the pilot valve 38 and the double piston 46 downwardly. The new position of the double piston 46 is indicated by the dotted lines. The weight 77 makes contact with the top of the piston rod by the groove or depression 78 in the lower surface thereof.

When the flow substantially ceases the double piston 21 will be elevated before the double piston 46 is lowered. This will cause the liquid under pressure to flow into the cylinder 26 on the right side of piston 27. This will open the valve 28 wide. This flow will be stopped as soon as the weight 77 resting upon the top of the piston rod 44 lowers the double piston 46 into the position indicated by the dotted lines. The flow will then take place by the line 80, the pilot cylinder 22 between the double pistons 21, the line 85, the line 49, the valve 48, the line 47, the pilot cylinder 38, above the double pistons 46, the line 89, and the line 82 against the left side of piston 27. The waste liquid from the right side of piston 27 will flow by line 83, the pilot cylinder 38 between the lowered double pistons 46, the line 81, the pilot cylinder 22, below the elevated double pistons 21 and the line 87. The valve 28 will close until it reaches the desired initial position at which point the raised portion 54 will contact with the rollered lever 53 closing the valve 48 and causing stoppage of the pressure flow. To prevent total closure of the valve 28 in case there may be leakage past the valve 48, the stops 90 are provided. These perform a similar function to the openings 57 and 58 shown in Figure 2. They keep the valve open sufficiently to permit a small flow which will cause the pilot valve piston 46 to be actuated into normal operating position when the main valve 55 is opened.

When the right arm of the lever is relieved of the moment of the weight 75 there will only be a much lesser moment remaining due to the small weight 77. The lever 17 is therefore very sensitive to slight changes of pressure in the diaphragm chamber 15. As soon as a very small initial flow takes place through the line 11, the right arm of the lever 17 will be elevated, lifting the weight 77 and permitting the double piston 46 to move back into its ordinary operating position.

In the arrangement shown in Figures 1, 3 and 4, it is possible that leakage may take place past the valve 48 so that as a result the butterfly valve 28 in Figure 1 or the gate valve 59 in Figure 3 will be altogether closed and prevent any passage of fluid through the line when the valve 55 is again opened after the flow has been stopped through the line for a period of time. To guard against this condition the arrangement shown in Figure 1 is provided wherein small openings 57 and 58 are cut in the pivoted plates 34 and 35 of the butterfly valve 28 (see Figure 2). In the arrangement shown in Figure 4 stops 90 may be provided to prevent complete closure of the valve. Even if leakage takes place past the valve 48, permitting the butterfly valve 28 in the arrangements shown in Figures 1 and 4 to close as much as possible, nevertheless sufficient water will pass through the openings 57 and 58 in Figure 1 or through the small opening left between the gates of the butterfly valve in Figure 4, to permit the pilot valves 22 and 38 to be actuated into their normal operating positions when the main valve is opened. A similar opening can also be cut in a gate valve, if one is substituted for the butterfly valve shown in Figures 1 and 4.

The arrangement shown in Figure 1 will operate in the following manner when the water is passing through a filter bed in which the resistance is steadily increasing. Any substantial flow through the line will raise the lever 41 and the weight 43 and cause the double piston 46 to be in elevated position. This will permit the water under pressure to pass from the line 40 to line 23. As the flow in the line 11 decreases, due to an increased resistance in the filter bed, the weight 19 will fall, lifting the double piston 21 which will permit fluid to pass under pressure from line 23 to 24 to open the butterfly valve 28. This will decrease the total resistance in the line and increase the rate of flow to the rating desired. This regulation will continue until the resistance of the filter bed has increased to such a point that the controlling valve 28 is wide open and back-washing is necessary. At that point, the line 11 will be cut off by closing the valve 55. As valve 55 is closed, the weight 19 on the lever 17 will drop since there will be a decreased difference in pressure in the diaphragm chamber 15 and the double piston 21 will be elevated permitting fluid under pressure to pass into the piston 26 opening wide the butterfly valve 28 upon the line 12. Shortly thereafter, when the valve 55 has been totally closed, the lighter weight 43 on the lever 41 will be unbalanced and will descend bringing down with it the double piston 46 into the position indicated by the dotted lines. The liquid under pressure will then be diverted into lines 47 and 49 and it will be admitted through lines 47 and 49 to the pilot valve 38. From the pilot valve 38 it will pass through the line 37, the pilot valve 22 and the line 25 to the piston 26 which will close the butterfly valve 28. When the valve has closed to such an extent that it will have a sufficient opening to rate the water passing through the fresh filter bed which has just been back-washed, the trip 54 on the piston rod 29 will cause the valve 48 to close, preventing any further passage of water under pressure to the piston 26. By changing the position of the trip 54 upon the piston rod 29, it is possible to secure any desired initial opening of the butterfly valve 28 when the flow is again started through the line 11.

The arrangements shown in Figures 3 and 4 function very similarly. The only difference in operation in the arrangement shown in Figure 3 resides in the fact that the resetting mechanism is actuated directly from the main valve instead of being actuated directly by the stoppage of flow in the influent line. When the normal flow is passing through the line, the main valve 55 in Figure 3 will be open and the piston rod 44 of the pilot valve 38 will be maintained in elevated position permitting the fluid under pressure to pass from line 40 to line 23. When the flow through the line 11 is stopped by closing gate valve 55, the piston 64 by its arm 66 will depress the piston rod 44 and the double piston 46 causing the water under pressure to pass through lines 47, 49 and 37 to the cylinder 26.

In the arrangement shown in Figure 4, the positions of the main pilot valve 22 and auxiliary pilot valve 38 are shown reversed and the liquid under pressure is caused to pass through the main pilot valve 22 before it passes through the auxiliary pilot valve 38. The resetting mechanism in this arrangement is actuated on the stoppage of flow in the influent line and one diaphragm is used to actuate both the main and auxiliary pilot valves. When the normal rated flow is passing through the line 11, the main valve 55 in Figure 4 will be open and the piston rod 44 of the auxiliary pilot valve 38 will be maintained in elevated position permitting the fluid under pressure to pass from line 84 to line 83 or from line 81 to line 82. When the flow through line 11 is stopped by closing the main valve 55, the weight 77 will depress the double piston 46 causing the pressure flow to take place through lines 80, 85, 49, 47 and 82 to cylinder 26. When the flow starts again in the line 11 the weight 78 will be raised from the top of the piston rod 44 and the compressed spring 88 will push the double piston 46 back into its normal operating position indicated by the full lines.

If desired the relative positions of the pilot valves in the arrangements shown in Figures 1 and 3 can be reversed as is shown in Figure 4 or on the other hand the relative positions of the main and auxiliary pilot valves in the arrangement shown in Figure 4 can be made the same as in the arrangements shown in Figures 1 or 3. The main and auxiliary pilot valves in the arrangements shown may also be utilized on a gas pressure line instead of a liquid pressure line. The connections of the throat and upstream pressures to the diaphragm chamber may be reversed, if desired, in any of the arrangements. In such a case the weight and pilot valve piston should be attached to the other arm of the lever. The Venturi tube-diaphragm chamber combination may be replaced by some other flow measuring device, and the main and auxiliary pilot valves could be actuated by said flow measuring device. The Venturi tube-diaphragm chamber combination, however, is preferred. The resetting mechanism can be caused to be actuated when the flow has reached any desired value and it can be caused to set the regulating valve in any desired position.

The manner of application of these flow control systems to filtration plants is shown upon Figures 5 and 6. In Figures 5 and 6 are illustrated the principal elements of a filtration plant used, for instance, in a municipality for purifying water that is to be distributed to the cosumers. The impure water is collected in large storage tanks from which it is led to a plurality of filtration beds. From the beds the purified water flows to a clear water well from which it is then supplied to the water distributing mains. In the drawings there is shown a battery of such filter beds 101 disposed alongside each other in a row. Each bed unit consists of a box-like chamber 102 having a transverse partition wall 103 separating the main part of the chamber 104 from the relatively narrow overflow chamber 105. Within the main chamber 104 are the filtration beds 106 proper, composed of a series of suitable layers of gravel and sand adapted to separate from the downwardly flowing water impurities and contaminations. The impure water is supplied to the individual beds from a main influent line 108 running from large storage tanks (not shown) along the battery of beds and having branches 109 leading to the beds. Suitable influent valves 110 in the branches 109 serve to shut off the supply of the water to the beds.

The filtered water is collected in the individual beds by means of collecting pipes 111 provided with a plurality of branch pipes 112 extending horizontally from both sides of the collecting pipe, the branch pipes being perforated so that the water after passing through the beds enters these pipes and therethrough the collecting pipes. The collecting pipes 111 have connected thereto effluent lines 115 through which the purified water is led away at 116 to the clear water well 117 of the plant. The effluent lines may be shut off and the water flow to the clear well cut off by means of main effluent valves 55′. These valves 55′ may be hand-controlled valves (see also valve 55 Figure 1) or may be remotely controlled by a hydraulic motor from a switchboard (see valves 55 Figures 3 and 4).

In the course of the purification the filter bed 106 gradually accumulates impurities and sediments from the water passing therethrough to the clear water well 117. As a result, the bed becomes gradually more and more clogged and its resistance to the flow of water therethrough increases.

As stated before for the satisfactory and efficient operation of such plants, it is extremely important to maintain a substantially constant rate of flow of the water from the filter bed to the clear water well, irrespective of the variations of the bed resistance. To this end there is provided in the effluent line an effluent regulating valve 59' the opening of which is controlled by a suitable regulating arrangement to compensate for the variations of the bed resistance so as to maintain a substantially constant rate of flow to the clear water well.

The arrangement of the control mechanism for said regulating valve 59' and of the associated regulating apparatus, is very similar to the arrangement shown upon Figure 1 with the exception of the valve 59' which is of the gate type instead of the butterfly type as shown upon Figure 1. It is obvious, of course, that the arrangements shown upon Figures 3 and 4 can also be utilized in partial or total substitution for the arrangement shown. The velocity of liquid flow per unit area is maintained constant in the effluent lines by varying the opening of the controlling valve 59' in the same manner as is set forth in the description of the manner of operation of arrangement shown in Figure 1. The parts shown in Figures 5 and 6 which correspond in function to the parts shown in Figure 1 are indicated by the same numeral which is primed. The gate valve 59' is operated similarly to the butterfly valve 28 and shown upon Figure 1 and is operated the same as the gate valve 59 indicated upon Figure 3 (the parts of valve 59' having the same function as valve 59 being indicated by the same numerals primed).

After a bed has been in operation for a certain time, the amount of sediment accumulated in the bed will become so large as to so far increase the flow resistance thereof that no further compensation can be effected by the regulating valve 59'. As a result, the flow would tend to decrease. To avoid such flow decrease provisions are made for washing the filter bed and removing therefrom the accumulated sediment. This is effected by means of a wash line 125 leading from a reservoir containing a wash water supply. The wash line is connected with the effluent line through branch pipes 126 having included therein wash line valves 127 for cutting off, the connection between the wash line and the effluent lines. There is also provided a waste line 128 into which the wash water may flow off after having been sent through the bed, the waste line being connected with the overflow chambers 105 of the individual beds by means of suitable branch pipes 129 including waste line valves 130.

To wash a filter bed, the inffluent line is closed by means of the associated influent valve 110; the associated effluent valve 55' is likewise closed; the waste line valve 130 is opened letting the water above the filter bed and in the overflow chamber 105 out into the waste line 128; and the associated wash line valve 127 is opened, causing the wash water to flow into the effluent line in opposite direction to the normal clear water flow. The wash water is thus passed into the collector pipe 111, thence through the branch pipes 112 flowing upwardly through the layers of the bed, and taking therewith the accumulated impurities and sediment, it proceeds by way of overflow chamber 105 and waste branch line 129 into the waste main 128. The wash water is thus circulated for a short period of time, say about six minutes, until the sediment is washed off. During the back washing operation the liquid flow per unit area may be maintained constant by the controlling valve 59'' and associated regulating apparatus indicated by double primed numerals. The arrangement of apparatus is the same as that shown connected to the effluent lines 115 and the parts having similar functions are designated by the same numerals double primed. The main valve 55' shown in the controlling apparatus connected to the effluent lines is omitted since its function is performed by the backwash valve 127. The backwash flow control system is attached to the line 11'' which is in turn connected to the backwash line 125.

After the bed has been purified, waste line valve 130 and wash line valve 127 are closed and the influent valve 110 again opened, again admitting water to the bed 106 from the influent line 108. The first flow of water through the bed is not sent directly into the clear water well, but is permitted to flow into the waste line to remove any leftover loosened sediment, there being provided auxiliary branch pipes 133 (see Figure 6) between the effluent lines 115 and the waste lines 128 into which the clear water flow may be diverted by means of valves 134. After re-washing the bed 106 by permitting a certain amount of clear water to flow into the waste line through the branch pipe 133, the associated valve 134 is again closed and the main effluent valve 55' opened to cause the clear water to flow again into the clear water well.

While the backwash is taking place and while valve or valves 55' are closed, the controlling valve 59' is being set in a position so that when the backwash is completed and the effluent line is opened the desired rating of liquid flow per unit area of filter bed will be obtained. This will be accomplished similarly as is described in the manner of operation of the arrangements shown in Figures 1, 3 and 4. When the backwash line is closed by the backwash valves 127 so that no flow takes place therein, the controlling valve 59'' is being set in a position so that when the backwash line is again turned on, the desired initial rate of flow through the clogged filtration bed will take place. If the backwash line is connected to a series of beds it is preferable to use the arrangements shown in Figures 1 or 4.

It will be noted that the wash line shown in Figure 5 is adapted to serve two or more filter beds. As it is customary in filtration plants to have but one wash line in a filtration plant and hence one rate of flow controller for the wash water, the double diaphragm casing type of flow control shown in Figure 1, or the single diaphragm casing type shown in Figure 4 are of particular advantage in that the wash water rate controller will function upon the opening or closing of the wash water valve at any of the individual filters without mechanical or other direct connection thereto. It is especially important in backwashing that the predetermined backwash rate be maintained during the entire backwashing operation. If the flow exceeds such normal predetermined rate there is danger that the sand might be washed out of the bed. If the flow is less than such predetermined rate it will have a much lessened efficiency in removing the clogging impurities and sediments. The above described flow control systems will not only maintain a constant flow while the backwash is taking place, but they will also insure that the predetermined flow will take place immediately upon initiation of the backwashing operation.

In the arrangements shown upon Figures 5 and 6 there are shown two beds with a single backwash line and with one effluent purified water line for each bed. The control mechanisms are shown positioned on the effluent filtration lines and on the influent backwash line. More beds may be utilized in each group and the number of backwash lines and effluent filtered water lines may be varied if desired.

In the case of pressure filters the flow controllers and accompanying reset mechanisms may be positioned on the influent line or on the effluent line as may be desired.

It will be noted that means for preventing total closure of the regulating valve 28 in case leakage takes place past the valve 48 are shown in Figures 1 and 4. The need for a means of preventing complete closure of the controlling valve is more apparent in the case of the arrangements shown in Figures 1 and 4 than it is for the arrangements shown in Figure 3. In Figure 3 even if the controlling valve 59 closes completely due to leakage past the valve 48 while the valve 55 is closed, the reopening of the main valve 55 will raise the double piston 46 and the liquid under pressure will thereupon flow through the pilot valve 22 against the lower side of the piston 26 opening the valve 59. The initiation of flow through the line 11 will then actuate the regulating valve 59 through the diaphragm chamber 15 the pilot valve 22 and the hydraulic cylinder 27 and cause a maintenance of a constant flow through line 11. In the arrangements shown in Figures 1 and 4, however, it is necessary to have a small flow in the conduit 11 to move the piston 46 of the auxiliary pilot valve 38 into its normal operating position. If leakage past valve 48 permits total closure of regulating valve 28 preventing any flow through the conduit 11 when the main valve 55 is opened, the piston 46 of the auxiliary pilot valve will not be moved into its normal operating position. It is therefore desirable to provide some means of preventing complete closure of the valve 28.

If difficulty is experienced with the above regulating and associated reset mechanisms due to hunting, such difficulty can be greatly lessened by decreasing the amount of movement of the lever of the diaphragm chamber. A means for accomplishing this is shown in Figure 1. The brackets 90 carry the set screws 91. The set screws 91 are so spaced that the lever 17 can only move between them. By adjusting the distance between the set screws so that the pilot valve will just uncover the ports in the cylinder of pilot valve 22 formed by the lines 24 and 25 at the limits of its upward and downward movement the hunting characteristics can be almost eliminated.

It will be noted that the regulating device of the present invention is especially adapted to be utilized either upon each of the effluent lines carrying filtered water or upon the common line carrying wash water to all of the filters. As previously stated, it is desirable that the regulating valve be automatically set in any line, when the line is closed, in such a position that the initial flow through the line when the same is opened will be the same or less than the predetermined rated flow, preferably the latter. In the latter case the wash flow or raw water flow when initiated should be somewhat less than the predetermined rated flow and then gradually increased until it reaches the rated flow. The automatic setting device of the present invention is set in operation by the closing of the effluent filtered water valve, if upon the effluent line, or by the closing of any one of the wash lines, if upon the wash line.

What is claimed is:

1. In a liquid treatment plant, treating apparatus, an effluent line from said treating apparatus, a main valve in said effluent line for cutting off the flow from said apparatus, a regulating valve in said effluent line for maintaining predetermined flow conditions in said line, flow measuring means, means associated with said flow measuring means to cause reduction of the opening of said regulating valve in response to an increase in the flow of said line and widening of the opening of said regulating valve in response to a decrease of flow in said line, and means actuated by the closing motion of said main valve for cutting out the regulating action of said regulating valve.

2. In a liquid treatment plant, treating apparatus, an effluent line leading from said treating apparatus, a main valve in said line for shutting off the flow from said apparatus, a regulating valve in said line for controlling the flow therein, means responsive to an increase or decrease of flow in said line for closing and widening, respectively, the opening in said regulating valve to maintain substantially uniform flow conditions in said line irrespective of the flow resistance of said apparatus, and means actuated by the motion of said main valve for cutting out or in the regulating action of said flow responsive means.

3. A flow control system comprising a conduit adapted to conduct a fluid, a main valve in said conduit for cutting off the fluid circulation, a regulating valve in said conduit for controlling the magnitude of the flow therein, fluid pressure means for actuating said regulating valve to vary the opening thereof, means responsive to the increase and decrease of the flow in said conduit for actuating said fluid pressure means, additional fluid pressure means actuated in response to the closure and opening of said main valve to control said first mentioned fluid pressure means, so as to cut out the regulating action of said flow responsive means and cause closure of said regulating valve in response to closure of said main valve and restore the regulating action of said flow responsive means in response to the opening of said main valve.

4. In combination, liquid treatment apparatus, an effluent line from said apparatus, a main valve in said effluent line, a regulating valve in said line, fluid pressure means for actuating said regulating valve to control the magnitude of the flow in said line, a diaphragm chamber-pilot valve mechanism actuated in response to increase and decrease of the flow in said line to cause closure and opening of said regulating valve, respectively, and additional diaphragm chamber-pilot mechanism means operative to produce closure of said regulating valve in response to the closure of said main valve and to restore said control action on the opening of said main valve.

5. In a fluid flow control system, a conduit for conducting a fluid from a point of high pressure to a point of low pressure, a regulating valve in said conduit, a hydraulic piston for operating said regulating valve, a pilot valve-pressure connection for controlling said piston, said pilot valve-pressure connection having a neutral position in which said piston holds said regulating valve stationary, a closing position in which said piston actuates said regulating valve to reduce the widths of the opening thereof, and an opening position in which said piston actuates said regulating valve to widen the opening thereof, a flow responsive means adapted to actuate the pilot valve-pressure connection so as to cause closing of the regulating valve upon an increase of flow above a predetermined point and to cause opening thereof upon a decrease of flow below said point but above a second predetermined point, a second pilot valve which is not actuated while the flow remains above said second point, but which is actuated so as to reroute the fluid pressure from the first mentioned pilot valve-pressure connection to said piston if the flow is below said range.

6. In a flow control apparatus, a conduit, means for maintaining a constant flow in said conduit comprising a piston-operated regulating valve, a differential pressure creating device, a diaphragm actuated by such differential pressure, and a pilot valve actuated by the movement of said diaphragm, said pilot valve admitting a fluid under pressure to the piston of said regulating valve and additional means for resetting said regulating valve at the desired initial flow position when the flow has fallen to a predetermined minimum.

7. In a flow control apparatus, a conduit, a differential pressure device upon said conduit, a pilot valve actuated by the variations in differential pressure, a piston, fluid connections between said pilot valve and the cylinder of said piston, a controlling valve upon said conduit actuated by said piston, and additional means for resetting said controlling valve at a desired position when the flow has reached a predetermined value, said resetting means comprising an additional pilot valve which acts to reroute the normal flow of fluid under pressure to the piston which actuates the controlling valve upon the line, so as to reset said valve upon the line to a desired position.

8. In a flow control system, a conduit, a regulating valve, a hydraulic cylinder adapted a actuate said regulating valve, a main valve, a Venturi tube, a diaphragm chamber, a diaphragm therein, the opposite sides of which are connected to up-stream and throat sections of said Venturi tube, a lever attached to and actuated by said diaphragm, a sliding weight upon said lever adapted to counterbalance the difference in pressure at the desired constant rate of flow, a pilot valve the piston of which is attached to and actuated by said lever, fluid pressure connections passing through said pilot valve to the hydraulic cylinder of said controlling valve, a second pilot valve inoperative when any substantial flow is taking place through the conduit but operative when the flow falls below a predetermined minimum to reverse the direction of pressure flow to the hydraulic cylinder to cause closure of the regulating valve and means for preventing total closure of the regulating valve so that when the main flow is started a small flow will take place sufficient to actuate the second pilot valve into normal operating position.

9. In the system of the claim 8 in which the last mentioned means comprises recessed openings in the face of the gates of the controlling valve.

In testimony whereof I have hereunto subscribed my name.

SAMUEL L. ADELSON.